US012713461B2

(12) United States Patent
Sun et al.

(10) Patent No.: US 12,713,461 B2
(45) Date of Patent: Aug. 18, 2026

(54) SOUNDING REFERENCE SIGNAL BASED UPLINK TO DOWNLINK CHANNEL OCCUPANCY TIME SHARING

(71) Applicant: QUALCOMM Incorporated, San Diego, CA (US)

(72) Inventors: Jing Sun, San Diego, CA (US); Arumugam Chendamarai Kannan, San Diego, CA (US); Vinay Chande, San Diego, CA (US); Siyi Chen, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 644 days.

(21) Appl. No.: 18/043,255

(22) PCT Filed: Nov. 10, 2020

(86) PCT No.: PCT/CN2020/127711
§ 371 (c)(1),
(2) Date: Feb. 27, 2023

(87) PCT Pub. No.: WO2022/099438
PCT Pub. Date: May 19, 2022

(65) Prior Publication Data
US 2023/0328786 A1 Oct. 12, 2023

(51) Int. Cl.
*H04W 74/0816* (2024.01)
*H04L 5/00* (2006.01)
*H04W 74/00* (2009.01)

(52) U.S. Cl.
CPC ....... *H04W 74/0816* (2013.01); *H04L 5/0051* (2013.01); *H04L 5/0053* (2013.01); *H04W 74/002* (2013.01)

(58) Field of Classification Search
CPC . H04W 74/0816; H04L 5/0051; H04L 5/0053
See application file for complete search history.

(56) References Cited

U.S. PATENT DOCUMENTS

2016/0344526 A1* 11/2016 Fan ........................ H04W 72/21
2017/0318607 A1* 11/2017 Tiirola .................... H04W 4/10
2018/0242372 A1 8/2018 Yang et al.
2019/0075001 A1 3/2019 Stern-Berkowitz et al.
(Continued)

OTHER PUBLICATIONS

International Search Report and Written Opinion—PCT/CN2020/127711—ISA/EPO—Jul. 29, 2021.
(Continued)

*Primary Examiner* — Jackie Zuniga Abad
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, a grant including information for triggering a clear channel assessment based sounding reference signal (SRS) transmission. The UE may perform the clear channel assessment for a channel based at least in part on receiving the grant. The UE may transmit, to the base station, the SRS that initiates a shared channel occupancy time (COT) on the channel based at least in part on performing the clear channel assessment. Numerous other aspects are provided.

30 Claims, 8 Drawing Sheets

(56) References Cited

U.S. PATENT DOCUMENTS

| | | | | |
|---|---|---|---|---|
| 2019/0215110 | A1 | 7/2019 | Yang et al. | |
| 2020/0053798 | A1* | 2/2020 | Tsai | H04W 72/23 |

OTHER PUBLICATIONS

Samsung: "Discussion on SRS for UL LAA", 3GPP TSG RAN WG1 Meeting #84bis, R1-162665, Busan, Korea, Apr. 11, 2016-Apr. 15, 2016, 4 Pages, Apr. 15, 2016 (Apr. 15, 2016) the whole document.

* cited by examiner

SOUNDING REFERENCE SIGNAL BASED UPLINK TO DOWNLINK CHANNEL OCCUPANCY TIME SHARING

CROSS-REFERENCE TO RELATED APPLICATION

This Patent Application is a 371 national stage of PCT Application No. PCT/CN2020/127711 filed on Nov. 10, 2020, entitled "SOUNDING REFERENCE SIGNAL BASED UPLINK TO DOWNLINK CHANNEL OCCUPANCY TIME SHARING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for sounding reference signal (SRS) based uplink to downlink channel occupancy time (COT) sharing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a UE includes receiving, from a base station, a grant including information for triggering a clear channel assessment based sounding reference signal (SRS) transmission; performing the clear channel assessment for a channel based at least in part on receiving the grant; and transmitting, to the base station, the SRS that initiates a shared channel occupancy time (COT) on the channel based at least in part on performing the clear channel assessment.

In some aspects, a method of wireless communication performed by a base station includes transmitting, to a UE, a grant including information for triggering a clear channel assessment based SRS transmission; receiving, from the UE, the SRS that initiates a shared COT on a channel based at least in part on the grant; and transmitting downlink data to the UE on the channel in the shared COT.

In some aspects, a UE for wireless communication includes a memory; and one or more processors operatively coupled to the memory, the memory and the one or more processors configured to: receive, from a base station, a grant including information for triggering a clear channel assessment based SRS transmission; perform the clear channel assessment for a channel based at least in part on receiving the grant; and transmit, to the base station, the SRS that initiates a shared COT on the channel based at least in part on performing the clear channel assessment.

In some aspects, a base station for wireless communication includes a memory; and one or more processors operatively coupled to the memory, the memory and the one or more processors configured to: transmit, to a UE, a grant including information for triggering a clear channel assessment based SRS transmission; receive, from the UE, the SRS that initiates a shared COT on a channel based at least in part on the grant; and transmit downlink data to the UE on the channel in the shared COT.

In some aspects, a non-transitory computer-readable medium storing a set of instructions for wireless communication includes one or more instructions that, when executed by one or more processors of a UE, cause the UE to: receive, from a base station, a grant including information for triggering a clear channel assessment based SRS transmission; perform the clear channel assessment for a channel based at least in part on receiving the grant; and transmit, to the base station, the SRS that initiates a shared COT on the channel based at least in part on performing the clear channel assessment.

In some aspects, a non-transitory computer-readable medium storing a set of instructions for wireless communication includes one or more instructions that, when executed by one or more processors of a base station, cause the base station to: transmit, to a UE, a grant including information for triggering a clear channel assessment based SRS transmission; receive, from the UE, the SRS that initiates a shared COT on a channel based at least in part on the grant; and transmit downlink data to the UE on the channel in the shared COT.

In some aspects, an apparatus for wireless communication includes means for receiving, from a base station, a grant including information for triggering a clear channel assessment based SRS transmission; means for performing the clear channel assessment for a channel based at least in part on receiving the grant; and means for transmitting, to the base station, the SRS that initiates a shared COT on the channel based at least in part on performing the clear channel assessment.

In some aspects, an apparatus for wireless communication includes means for transmitting, to a UE, a grant including information for triggering a clear channel assessment based SRS transmission; means for receiving, from the UE, the SRS that initiates a shared COT on a channel based at least in part on the grant; and means for transmitting downlink data to the UE on the channel in the shared COT.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
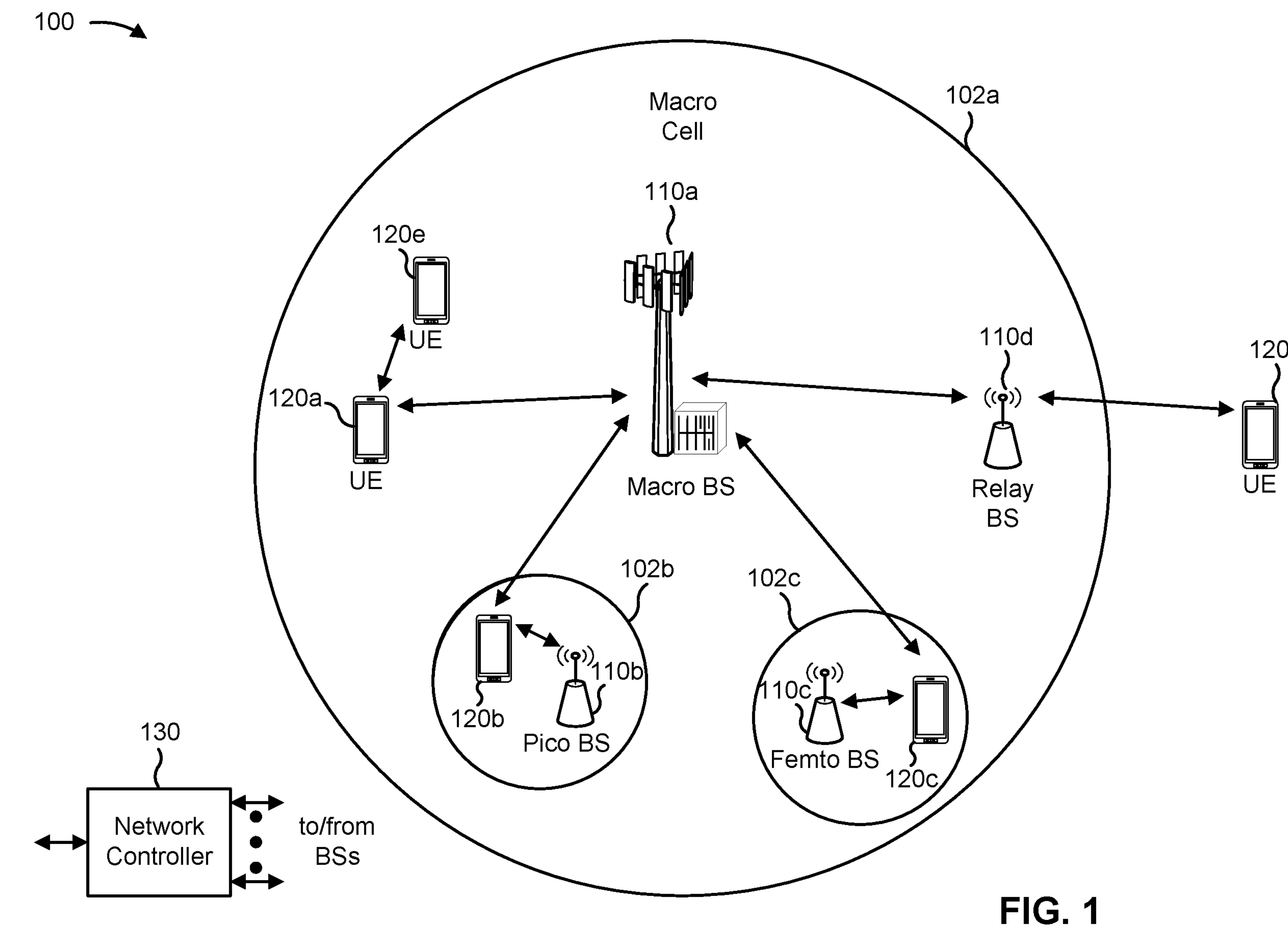
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. ABS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
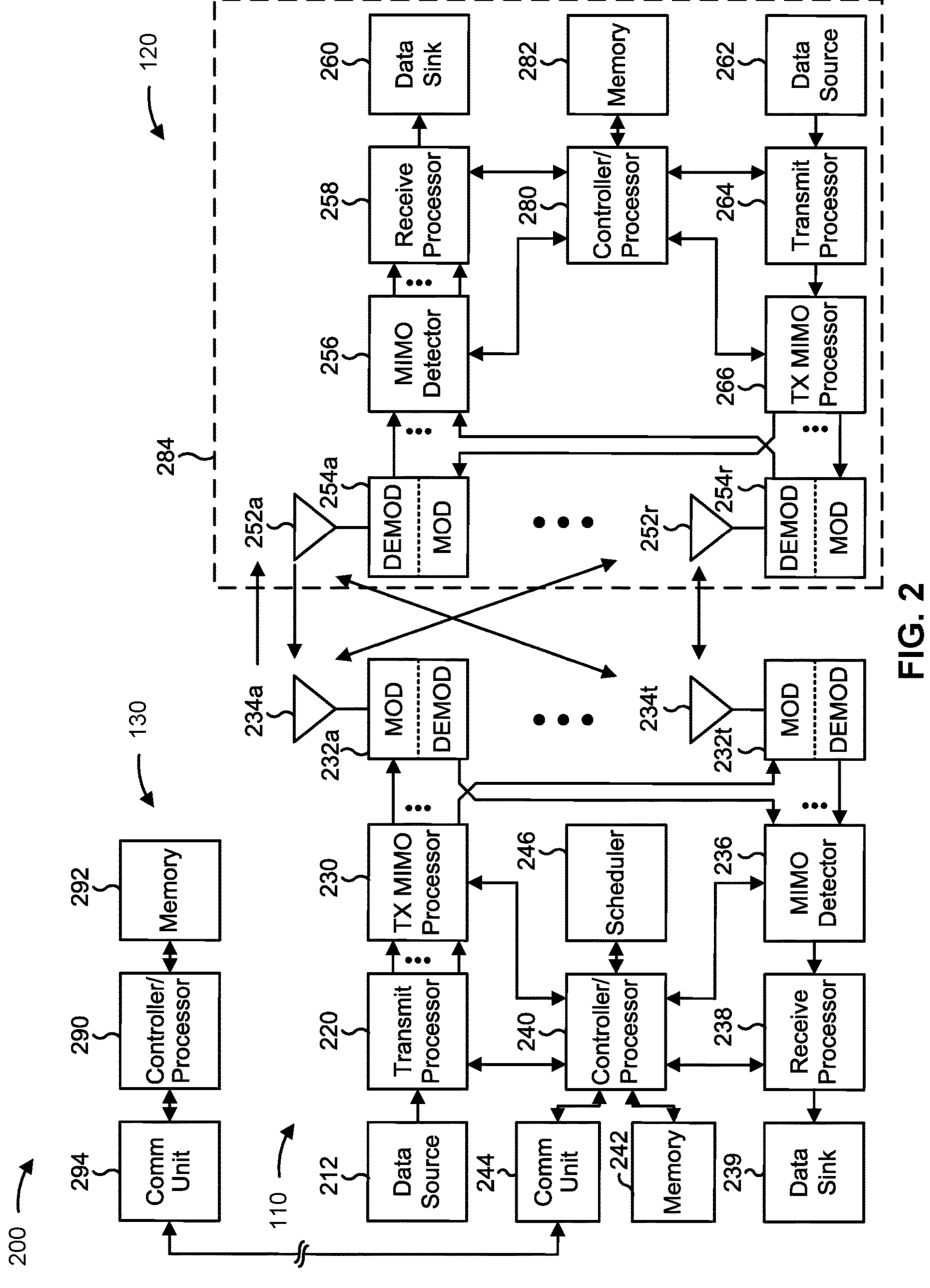
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-5.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-5.

Controller/processor 240 of base station 110, controller/processor 280 of UE 120, and/or any other component(s) of FIG. 2 may perform one or more techniques associated with sounding reference signal (SRS) based uplink to downlink channel occupancy time (COT) sharing, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, interpreting the instructions, and/or the like.

In some aspects, the UE 120 includes means for receiving, from a base station, a grant including information for triggering a clear channel assessment based SRS transmission; means for performing the clear channel assessment for a channel based at least in part on receiving the grant; and/or means for transmitting, to the base station, the SRS that initiates a shared COT on the channel based at least in part on performing the clear channel assessment. The means for the UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE 120 includes means for receiving, from the base station, downlink data transmitted on the channel in the shared COT.

In some aspects, the UE 120 includes means for transmitting the SRS without transmitting a physical uplink control channel (PUCCH) communication based at least in part on the downlink grant DCI that includes the indication for triggering transmission of the SRS and does not include a valid PDSCH assignment.

In some aspects, the base station 110 includes means for transmitting, to a UE, a grant including information for triggering a clear channel assessment based SRS transmission; means for receiving, from the UE, the SRS that initiates a shared COT on a channel based at least in part on the grant; and/or means for transmitting downlink data to the UE on the channel in the shared COT. The means for the base station 110 to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In some communications systems, wireless network devices (e.g., UE 120 and/or base station 110) may communicate on an unlicensed spectrum. In this case, a transmitting device may contend against other devices for channel access before transmitting on a channel in the unlicensed spectrum to reduce and/or prevent collisions on the unlicensed channel. To contend for channel access, the transmitting device may perform a clear channel assessment (CCA), such as a listen-before-talk (or listen-before-transmit) (LBT) procedure or another type of channel access procedure, for unlicensed frequency band channel access. The CCA may be performed to determine whether the physical channel (e.g., the radio resources of the channel) are free to use or are busy (e.g., in use by another wireless communication device such as a UE, an IoT device, or a wireless local area network (WLAN) device, among other examples). The CCA may include sensing or measuring the physical channel (e.g., performing a reference signal received power (RSRP) measurement, detecting an energy level, or performing another type of measurement) during a channel access gap (which may also be referred to as a contention window (CW)) and determining whether the unlicensed channel is free or busy based at least in part on the signals sensed or measured on the physical channel (e.g., based at least in part on whether the measurement satisfies a threshold). If the transmitting device determines that the CCA was successful, the transmitting device may perform one or more transmissions on the shared or unlicensed channel during a transmission opportunity (TXOP).

In some cases, if the transmitting device determines that the CCA was successful, the transmitting device may initiate a channel occupancy time (COT) in which the channel is reserved for a duration that is less than a threshold duration. In some cases, the transmitting device may share the COT with another device, to allow the other device to transmit on the channel during the COT. In order to initiate a COT, a transmitting device may perform an extended CCA (eCCA), such as a Category 4 LBT procedure.

Figure 3:
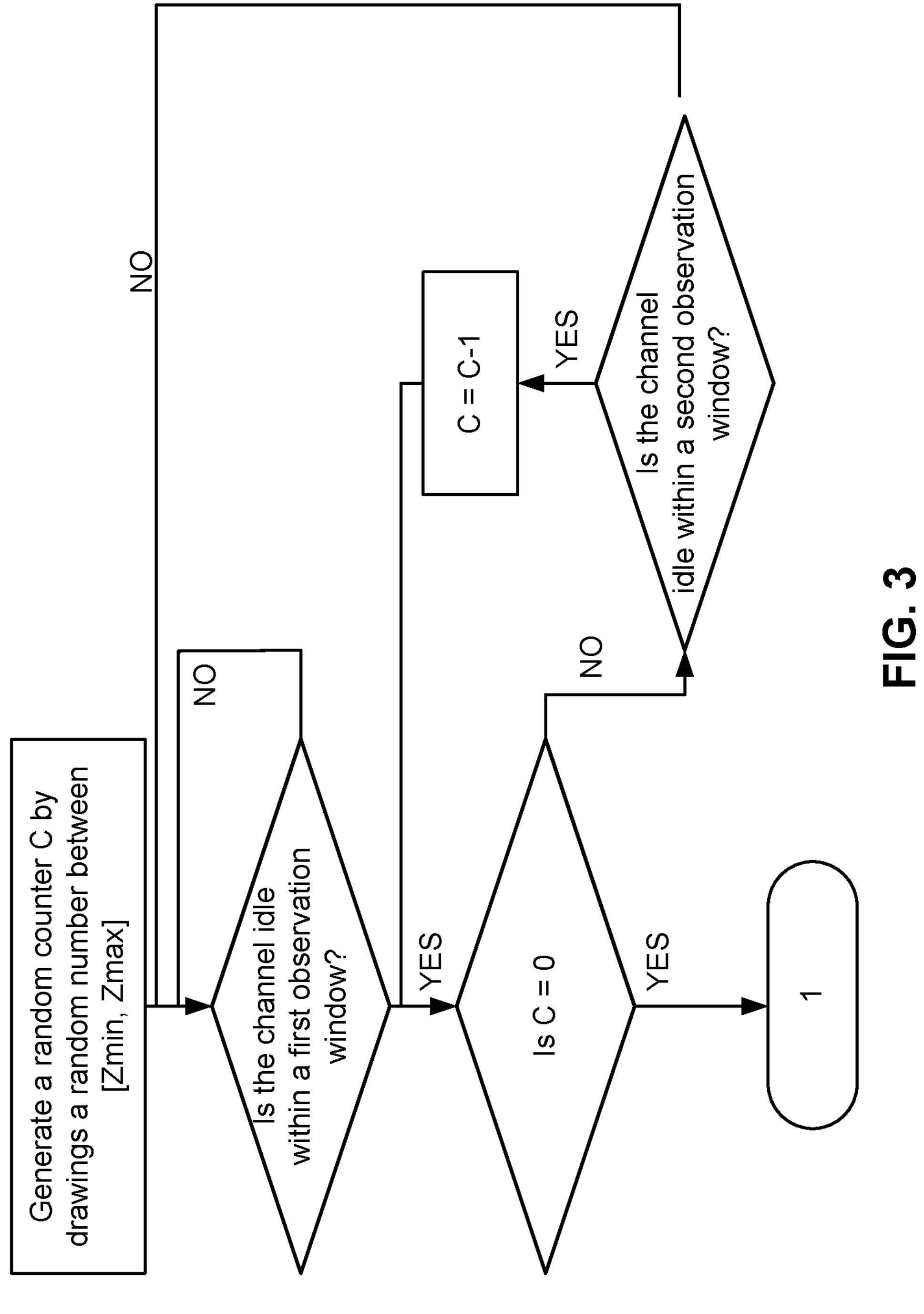
FIG. 3 is a diagram illustrating an example of an extended clear channel assessment (eCCA), in accordance with various aspects of the present disclosure

FIG. 3 is a diagram illustrating an example 300 of an extended CCA (eCCA), in accordance with various aspects of the present disclosure. For example, the eCCA may be a Category 4 LBT procedure. The eCCA may be performed by a transmitting device to determine whether the transmitting device may initiate a COT on a channel in an unlicensed spectrum. As shown in FIG. 3, when the transmitting device may generate a random counter C by drawing a random number between [Zmin, Zmax] (e.g., [0, 3]). The transmitting device may then determine whether the channel is idle within a first observation window (e.g., an observation window of 8 microseconds (μs)). If the channel is idle in the first observation window, the transmitting device may determine if the channel if idle in C subsequent second observation windows (5 μs observation windows). If the channel is idle in the second observation windows, the eCCA is successful, and the transmitting device may transmit on the channel and initiate the COT on the channel.

As indicated above, FIG. 3 is provided as an example. Other examples may differ from what is described with respect to FIG. 3.

For communication between a base station and a UE on a channel in an unlicensed spectrum in the millimeter wave band (e.g., 60 GHz unlicensed band), a narrow beamforming operation may be used to establish a wireless link between the base station and the UE. In this case, channel sensing by the transmitting device may not accurately represent the interference level on the channel for the receiving device. For example, when a base station is transmitting a downlink data burst to a UE using a channel in the unlicensed spectrum in the millimeter wave band, the base station may perform a CCA and transmit the downlink data burst to the UE if the CCA is successful. However, the UE may experience interference on the channel that was not sensed by the base station. This may lead to unreliable data transmission from the base station to the UE. This may also lead to re-transmission of the downlink data, which may result in increased consumption of network resources.

In some aspects, receiver side channel sensing may be performed by a UE prior to a base station transmitting data to the UE on a channel in an unlicensed spectrum. For example, the base station may transmit, to the UE, a pre-grant message to trigger the UE to perform an eCCA on the channel. After the UE performs the eCCA to confirm that there is not interference with UE reception on the channel, the UE may transmit acknowledgement (ACK) to the pre-grant message back to the base station. The base station may then transmit a downlink data burst to the UE on the channel. However, a regulation regarding channel access in the unlicensed spectrum may require that the CCA check be performed by the device that initiates transmission on the channel in the unlicensed spectrum.

In some aspects, the base station may trigger the UE to initiate a COT on a channel in the unlicensed spectrum after performing a successful eCCA (e.g., Category 4 LBT) and share the COT with the base station. The base station may then use the shared COT to transmit the data burst on the channel. The base station may transmit, to the UE, an unsolicited uplink grant to the UE grant granting the UE a Category 4 LBT based physical uplink shared channel (PUSCH) transmission. This PUSCH transmission may initiate a COT, which may then be shared by the base station to transmit a downlink data burst to the UE. However, the base station may transmit the unsolicited uplink grant knowing that the UE does not have uplink data to be transmitted to the base station, and the UE may send a zero padded PUSCH transmission to the base station. This may consume network resources for the UE to send a PUSCH transmission that does not include any uplink data. In addition, the base station may take time to decode the PUSCH transmission prior to transmitting the downlink data to the UE, resulting in increased latency and reduced speed for transmitting the downlink data. Alternatively, the base station may transmit, to the UE, a channel state information (CSI) reference signal (CSI-RS) and use the uplink grant to trigger an aperiodic CSI report in the PUSCH transmission by the UE. In this case, the PUSCH transmission may include CSI that may help the base station with future downlink scheduling. However, the CSI computation by the UE takes time, and therefore may result in additional delays in transmitting the downlink data to the UE.

Some techniques and apparatuses described herein enable a base station to trigger an SRS transmission from a UE to initiate a COT. The base station may transmit, to a UE, an uplink or downlink grant including information for dynamically triggering a CCA-based SRS. The UE may perform the CCA on a channel and transmit, to the base station, an SRS that initiates a COT on the channel based at least in part on performing the CCA. The base station may transmit downlink data to the UE on the channel in the COT. As a result, the COT may be initiated using a dynamically triggered SRS instead of a PUSCH transmission by the UE. This may reduce the network resources consumed to initiate the COT, as compared with using a PUSCH transmission without uplink data or a PUSCH transmission including a CSI report. Furthermore, the SRS waveform may not need to be decoded by the base station, and transmitting the SRS consumes less time than computing CSI. Therefore, using the SRS to initiate the COT may result in the downlink data being transmitted to the UE with reduced latency and increased speed.

Figure 4:
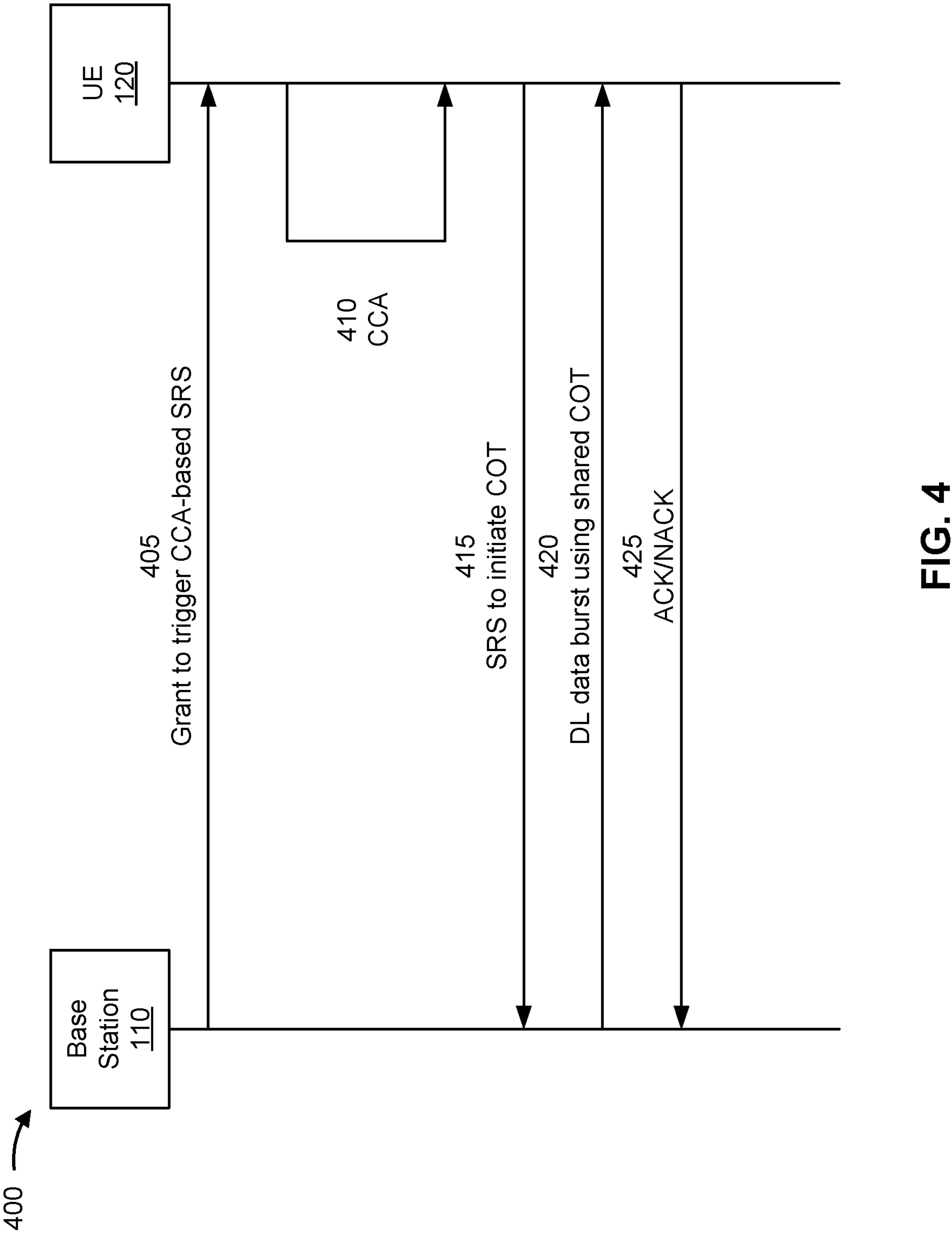
FIG. 4 is a diagram illustrating an example associated with sounding reference signal (SRS) based uplink to downlink channel occupancy time (COT) sharing, in accordance with various aspects of the present disclosure.

FIG. 4 is a diagram illustrating an example 400 associated with sounding reference signal (SRS) based uplink to downlink channel occupancy time (COT) sharing in accordance with various aspects of the present disclosure. As shown in FIG. 4, example 400 includes communication between a base station 110 and a UE 120. In some aspects, the base station 110 and the UE 120 may be included in a wireless network, such as wireless network 100. The base station 110 and the UE 120 may communicate on a wireless access link, which may include an uplink and a downlink. In some aspects, the base station 110 and the UE 120 may communicate via a channel in an unlicensed spectrum, such as an unlicensed spectrum of the millimeter wave band (e.g., 60 GHz unlicensed band).

As shown in FIG. 4, and by reference number 405, the base station 110 may transmit, to the UE 120, a grant to trigger a CCA-based SRS. The grant may be a downlink grant or an uplink grant. The grant may include information for dynamically triggering the CCA-based SRS. In some aspects, the grant and the information for triggering the CCA-based SRS may be included in downlink control information (DCI) transmitted by the base station 110 to the UE 120 in a physical downlink control channel (PDCCH) communication. In some aspects, the DCI may include an SRS trigger field, which may include an indication for triggering SRS transmission by the UE 120. In some aspects, the DCI may include an LBT type field, which may include an indication of a type of the CCA to be performed by the UE 120. For example, the LBT type field may provide an indication of a Category 4 LBT procedure to be performed by the UE 120.

In some aspects, the grant may be a downlink grant, and the information for triggering the CCA-based SRS may be downlink grant DCI. In some aspects, the base station 110 may transmit downlink grant DCI without a downlink assignment (e.g., without assigning resources for physical downlink shared channel (PDSCH) communications). For example, the downlink grant DCI may include a frequency domain resource allocation (FDRA) field that is set to all zeros to indicate an invalid FDRA assignment. Downlink grant DCI including the indication for triggering SRS transmission and not including a valid PDSCH assignment may trigger the CCA-based SRS by the UE 120. In some aspects, the downlink grant DCI including the indication for triggering SRS transmission and not including a valid PDSCH assignment may also indicate to the UE 120 not to transmit PUCCH feedback associated with the downlink grant. In some aspects, the downlink grant DCI that triggers the CCA-based SRS transmission may also include the indication of the Category 4 LBT type.

In some aspects, the grant may be an uplink grant, and the information for triggering the CCA-based SRS may be uplink grant DCI. In some aspects, the base station 110 may transmit uplink grant DCI without an uplink assignment (e.g., without assigning resources for PUSCH communications). For example, the uplink grant DCI may include an FDRA field that is set to all zeros to indicate an invalid FDRA assignment. Uplink grant DCI including the indication for triggering SRS transmission and not including a valid PUSCH assignment may trigger the CCA-based SRS by the UE 120. In some aspects, the uplink grant DCI that triggers the CCA-based SRS transmission may also include the indication of the Category 4 LBT type.

In some aspects, the base station 110 may perform a Category 4 LBT procedure on a channel in the unlicensed spectrum prior to transmitting the grant on the channel. In this case, the base station 110 may initiate a COT that is only used for transmitting the grant to the UE 120. In some aspects, the base station 110 may transmit the grant to the UE 120 without performing an LBT procedure. In aspects, the base station 110 may perform a Category 2 LBT prior to transmitting the grant to the UE 120. The Category 2 LBT is a "light" LBT, as compared to the Category 4 LBT, that may be performed for a deterministic duration.

As further shown in FIG. 4, and by reference number 410, the UE 120 may perform the CCA for a channel based at least in part on receiving the grant. For example, the channel may be in the unlicensed spectrum of the millimeter wave band. In some aspects, the UE 120 may perform an eCCA, such as the Category 4 LBT procedure, for the channel to determine whether the channel is idle. In some aspects, the channel may be selected by the UE 120. In some aspects, the channel may be selected by the base station 110. In this case, the grant may include an indication of the channel for which the UE 120 is to perform the CCA.

As further shown in FIG. 4, and by reference number 415, the UE 120 may transmit, to the base station 110, an SRS that initiates a shared COT on the channel. The UE 120 may transmit the SRS that initiates the shared COT based at least in part on performing the CCA on the channel. For example, transmission of the SRS by the UE 120 may be conditioned on a successful CCA (e.g., Category 4 LBT) for the channel.

As described above, the grant may be an uplink grant or a downlink grant. In a case in which downlink grant DCI triggers the CCA-based SRS, the UE 120 ignore PUCCH information in the DL DCI and skip the PUCCH associated the downlink grant. For example, the UE 120 may transmit the SRS to the base station 110 without transmitting PUCCH feedback associated with the downlink grant. In a case in which uplink grant DCI triggers the CCA-based SRS, there uplink grant DCI may not include a valid PUSCH assignment, and the UE 120 may transmit the SRS without transmitting a PUSCH communication.

As further shown in FIG. 4, and by reference number 420, the base station 110 may transmit, to the UE 120, a downlink data burst on the channel in the shared COT. For example, the base station 110 may transmit downlink data to the UE 120 in one or more PDSCH communications on the channel in the shared COT. The base station 110 may transmit the UE 120 based at least in part on receiving the SRS from the UE 120.

As further shown in FIG. 4, and by reference number 425, the UE 120 may transmit, to the base station 110, ACK or negative ACK (NACK) feedback associated with the downlink data received from the base station 110. For example, the UE 120 may transmit hybrid automatic repeat request (HARD) ACK or NACK feedback for the downlink data received from the base station 110. The ACK or NACK feedback may be transmitted to the base station 110 in a PUCCH communication.

In some aspects, a timeline between the UE 120 receiving grant and the UE 120 transmitting the SRS and a timeline between the base station 110 receiving the SRS and the base station 110 transmitting the downlink data may be different than an NR timeline associated with NR timelines associated with PUSCH generation. For example, the generation of the SRS by the UE 120 may require less processing time than a PUSCH generation. The timeline may be further improved by using a search space restriction when monitoring the grant that triggers the SRS. In this case, the UE 120 may be configured with a small search space to monitor the grant that triggers the SRS, and the UE 120 may switch to a larger search space in the COT after detecting the initial grant. In some aspects, a time offset between the grant and the SRS may be indicated by the base station 110 in the grant. For example, the base station 110 may determine the time offset based at least in part on a capability of the UE 120.

The SRS to downlink transmission timeline may be compressed because the detection of the SRS by the base station 110 may require less processing time than the detecting and decoding of a PUSCH communication. In some aspects, the downlink PDSCH communication may be pre-generated by the base station 110 and transmitted once the SRS is received, such that time for generating the PDSCH communication may not be included in the timeline. In this case, the base station 110 may cancel transmission of the pre-generated PDSCH communication.

As described above in connection with FIG. 4, the base station 110 may trigger an SRS transmission from the UE 120 to initiate a COT. The base station 110 may transmit, to the UE 120, an uplink or downlink grant including information for dynamically triggering a CCA-based SRS. The UE 120 may perform the CCA on a channel and transmit, to the base station 110, an SRS that initiates a shared COT on the channel based at least in part on performing the CCA. The base station 110 may transmit downlink data to the UE 120 on the channel in the shared COT. As a result, network resources consumed to initiate the COT may be reduced, as compared with using a PUSCH transmission to initiate the COT. Furthermore, the downlink data may be transmitted to the UE 120 with reduced latency and increased speed.

As indicated above, FIG. 4 is provided as an example. Other examples may differ from what is described with respect to FIG. 4.

Figure 5:
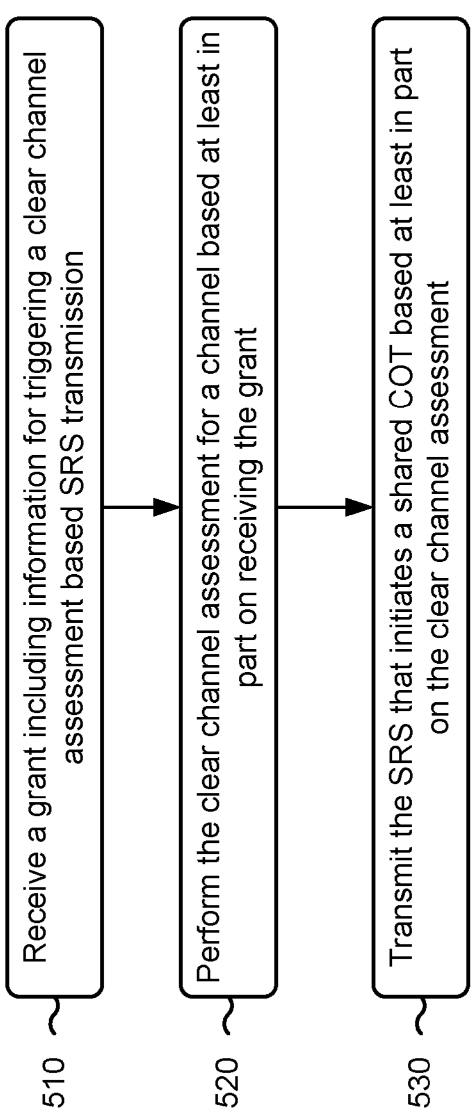
FIGS. 5-6 are diagrams illustrating example processes associated with SRS based uplink to downlink COT sharing, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120) performs operations associated with SRS based uplink to downlink COT sharing.

As shown in FIG. 5, in some aspects, process 500 may include receiving, from a base station, a grant including information for triggering a clear channel assessment based SRS transmission (block 510). For example, the UE (e.g., using reception component 702, depicted in FIG. 7) may receive, from a base station, a grant including information for triggering a clear channel assessment based SRS transmission, as described above.

As further shown in FIG. 5, in some aspects, process 500 may include performing the clear channel assessment for a channel based at least in part on receiving the grant (block 520). For example, the UE (e.g., using performing component 708, depicted in FIG. 7) may perform the clear channel assessment a channel based at least in part on receiving the grant, as described above.

As further shown in FIG. 5, in some aspects, process 500 may include transmitting, to the base station, the SRS that initiates a shared COT on the channel based at least in part on performing the clear channel assessment (block 530). For example, the UE (e.g., using transmission component 704, depicted in FIG. 7) may transmit, to the base station, the SRS that initiates a shared COT on the channel based at least in part on performing the clear channel assessment, as described above.

Process 500 may include additional aspects, such as any single aspect or any combination of aspects described below and/or in connection with one or more other processes described elsewhere herein.

In a first aspect, process 500 includes receiving, from the base station, downlink data transmitted on the channel in the shared COT.

In a second aspect, alone or in combination with the first aspect, the downlink data is included in one or more PDSCH communications.

In a third aspect, alone or in combination with one or more of the first and second aspects, the clear channel assessment is an extended clear channel assessment.

In a fourth aspect, alone or in combination with one or more of the first through third aspects, the clear channel assessment is an LBT procedure.

In a fifth aspect, alone or in combination with the fourth aspect, the LBT procedure is a Category 4 LBT procedure.

In a sixth aspect, alone or in combination with one or more of the first through fifth aspects, the information for triggering the clear channel assessment based SRS transmission includes DCI including an indication for triggering transmission of the SRS and an indication of a type of the clear channel assessment.

In a seventh aspect, alone or in combination with the sixth aspect, the DCI indicates that the type of the clear channel assessment is a Category 4 LBT procedure.

In an eighth aspect, alone or in combination with one or more of the first through seventh aspects, the grant is a downlink grant.

In a ninth aspect, alone or in combination with the eighth aspect, the information for triggering the clear channel assessment based SRS transmission is downlink grant DCI that includes an indication for triggering transmission of the SRS and does not include a valid PDSCH assignment.

In a tenth aspect, alone or in combination with the ninth aspect, the downlink grant DCI includes a frequency domain resource allocation field set to all zeros.

In an eleventh aspect, alone or in combination with one or more of the ninth through tenth aspects, transmitting the SRS the initiates the shared COT on the channel comprises transmitting the SRS without transmitting a PUCCH communication based at least in part on the downlink grant DCI that includes the indication for triggering transmission of the SRS and does not include a valid PDSCH assignment.

In a twelfth aspect, alone or in combination with one or more of the first through seventh aspects, the grant is an uplink grant.

In a thirteenth aspect, alone or in combination with the twelfth aspect, the information for triggering the clear channel assessment based SRS transmission is uplink grant DCI that includes an indication for triggering transmission of the SRS and does not include a valid PUSCH assignment.

In a fourteenth aspect, alone or in combination with the thirteenth aspect, the uplink grant DCI includes a frequency domain resource allocation field set to all zeros.

In a fifteenth aspect, alone or in combination with one or more of the first through fourteenth aspects, the channel is in an unlicensed spectrum.

In a sixteenth aspect, alone or in combination with the fifteenth aspect, the unlicensed spectrum is in a millimeter wave frequency band.

In a seventeenth aspect, alone or in combination with one or more of the first through sixteenth aspects, the grant includes an indication of a time offset between the UE receiving the grant and the UE transmitting the SRS.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
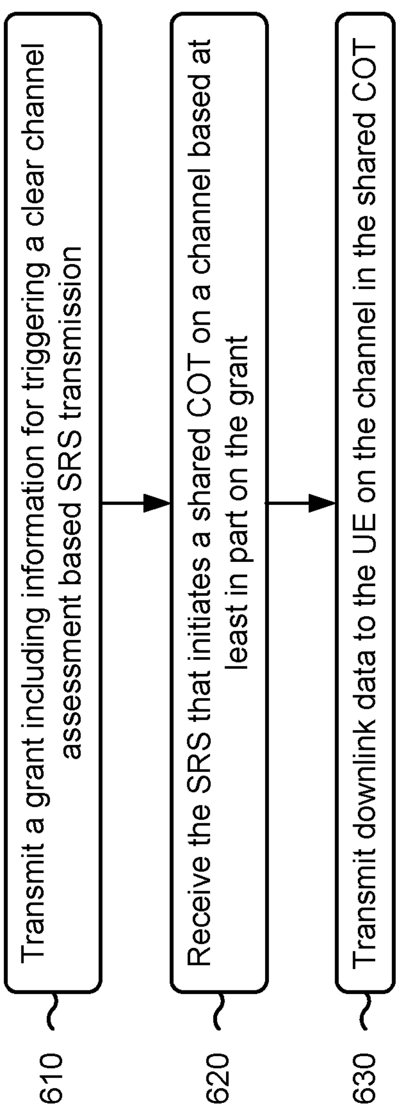

FIG. 6 is a diagram illustrating an example process 600 performed, for example, by a base station, in accordance with various aspects of the present disclosure. Example process 600 is an example where the base station (e.g., base station 110) performs operations associated with SRS based uplink to downlink COT sharing.

As shown in FIG. 6, in some aspects, process 600 may include transmitting, to a UE, a grant including information for triggering a clear channel assessment based SRS transmission (block 610). For example, the base station (e.g., using transmission component 804, depicted in FIG. 8) may transmit, to a UE, a grant including information for triggering a clear channel assessment based SRS transmission, as described above.

As further shown in FIG. 6, in some aspects, process 600 may include receiving, from the UE, the SRS that initiates a shared COT on a channel based at least in part on the grant (block 620). For example, the base station (e.g., using reception component 802, depicted in FIG. 8) may receive, from the UE, the SRS that initiates a shared channel occupancy time (COT) on a channel based at least in part on the grant, as described above.

As further shown in FIG. 6, in some aspects, process 600 may include transmitting downlink data to the UE on the channel in the shared COT (block 630). For example, the base station (e.g., using transmission component 804, depicted in FIG. 9) may transmit downlink data to the UE on the channel in the shared COT, as described above.

Process 600 may include additional aspects, such as any single aspect or any combination of aspects described below and/or in connection with one or more other processes described elsewhere herein.

In a first aspect, the downlink data is included in one or more PDSCH communications.

In a second aspect, alone or in combination with the first aspect, the clear channel assessment is an extended clear channel assessment.

In a third aspect, alone or in combination with one or more of the first and second aspects, the clear channel assessment is an LBT procedure.

In a fourth aspect, alone or in combination with the third aspect, the LBT procedure is a Category 4 LBT procedure.

In a fifth aspect, alone or in combination with one or more of the first through fourth aspects, the information for triggering the clear channel assessment based SRS transmission includes DCI including an indication for triggering transmission of the SRS and an indication of a type of the clear channel assessment.

In a sixth aspect, alone or in combination with the fifth aspect, the DCI indicates that the type of the clear channel assessment is a Category 4 LBT procedure.

In a seventh aspect, alone or in combination with one or more of the first through sixth aspects, the grant is a downlink grant.

In an eighth aspect, alone or in combination with the seventh aspect, the information for triggering the clear channel assessment based SRS transmission is downlink grant DCI that includes an indication for triggering transmission of the SRS and does not include a valid PDSCH assignment.

In a ninth aspect, alone or in combination with the eighth aspect, the downlink grant DCI includes a frequency domain resource allocation field set to all zeros.

In a tenth aspect, alone or in combination with one or more of the first through sixth aspects, the grant is an uplink grant.

In an eleventh aspect, alone or in combination with the tenth aspect, the information for triggering the clear channel assessment based SRS transmission is uplink grant DCI that includes an indication for triggering transmission of the SRS and does not include a valid PUSCH assignment.

In a twelfth aspect, alone or in combination with the eleventh aspect, the uplink grant DCI includes a frequency domain resource allocation field set to all zeros.

In a thirteenth aspect, alone or in combination with one or more of the first through twelfth aspects, the channel is in an unlicensed spectrum.

In a fourteenth aspect, alone or in combination with the thirteenth aspect, the unlicensed spectrum is in a millimeter wave frequency band.

In a fifteenth aspect, alone or in combination with one or more of the first through fourteenth aspects, the grant includes an indication of a time offset between the UE receiving the grant and the UE transmitting the SRS.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
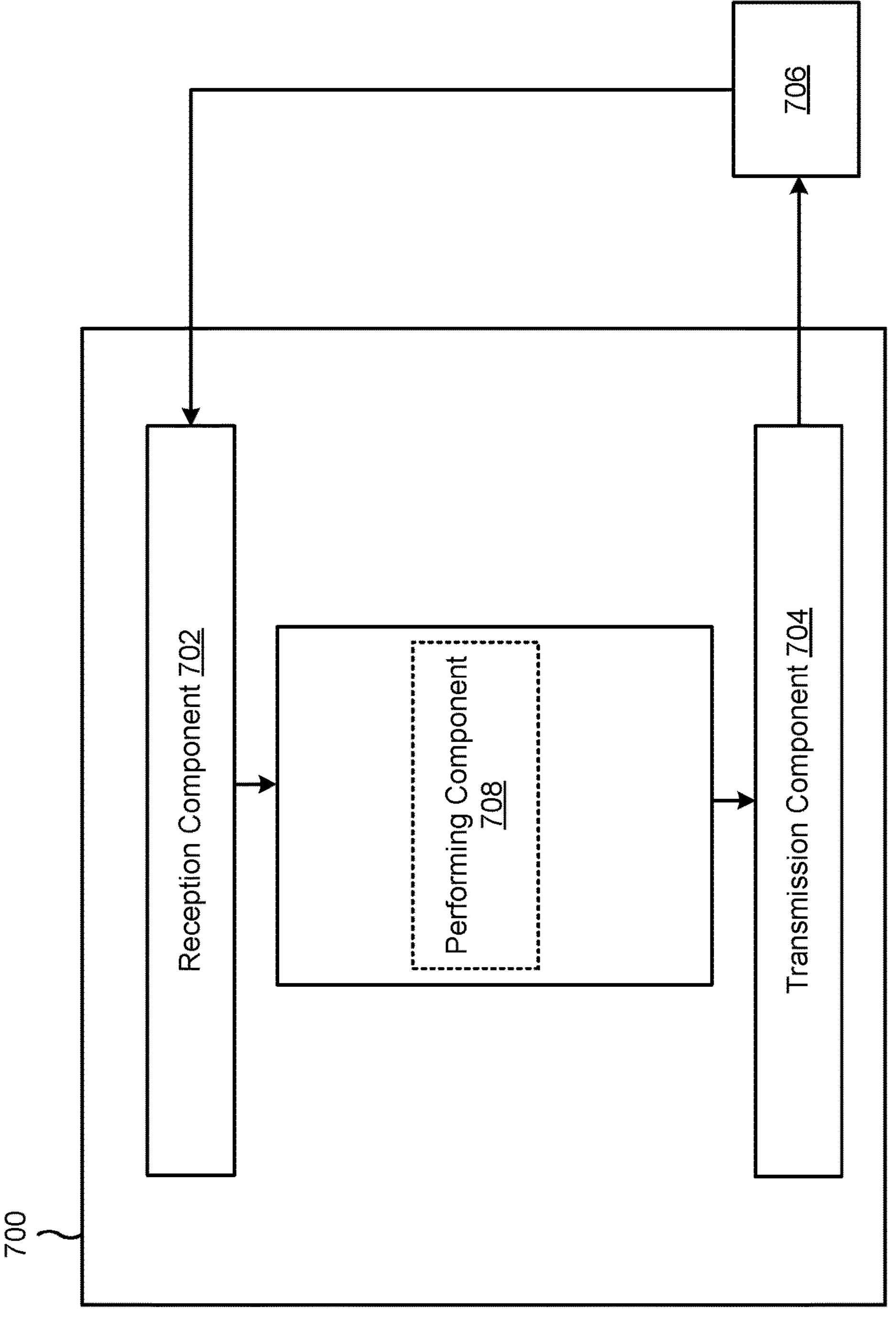
FIGS. 7-8 are block diagrams of example apparatuses for wireless communication, in accordance with various aspects of the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a performing component 708, among other examples.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5, or a combination thereof. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be collocated with the reception component 702 in a transceiver.

The reception component 702 may receive, from a base station, a grant including information for triggering a clear channel assessment based SRS transmission. The performing component 708 may perform the clear channel assessment for a channel based at least in part on receiving the grant. In some aspects, the performing component 708 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The transmission component 704 may transmit, to the base station, the SRS that initiates a shared COT on the channel based at least in part on performing the clear channel assessment.

The reception component 702 may receive, from the base station, downlink data transmitted on the channel in the shared COT.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
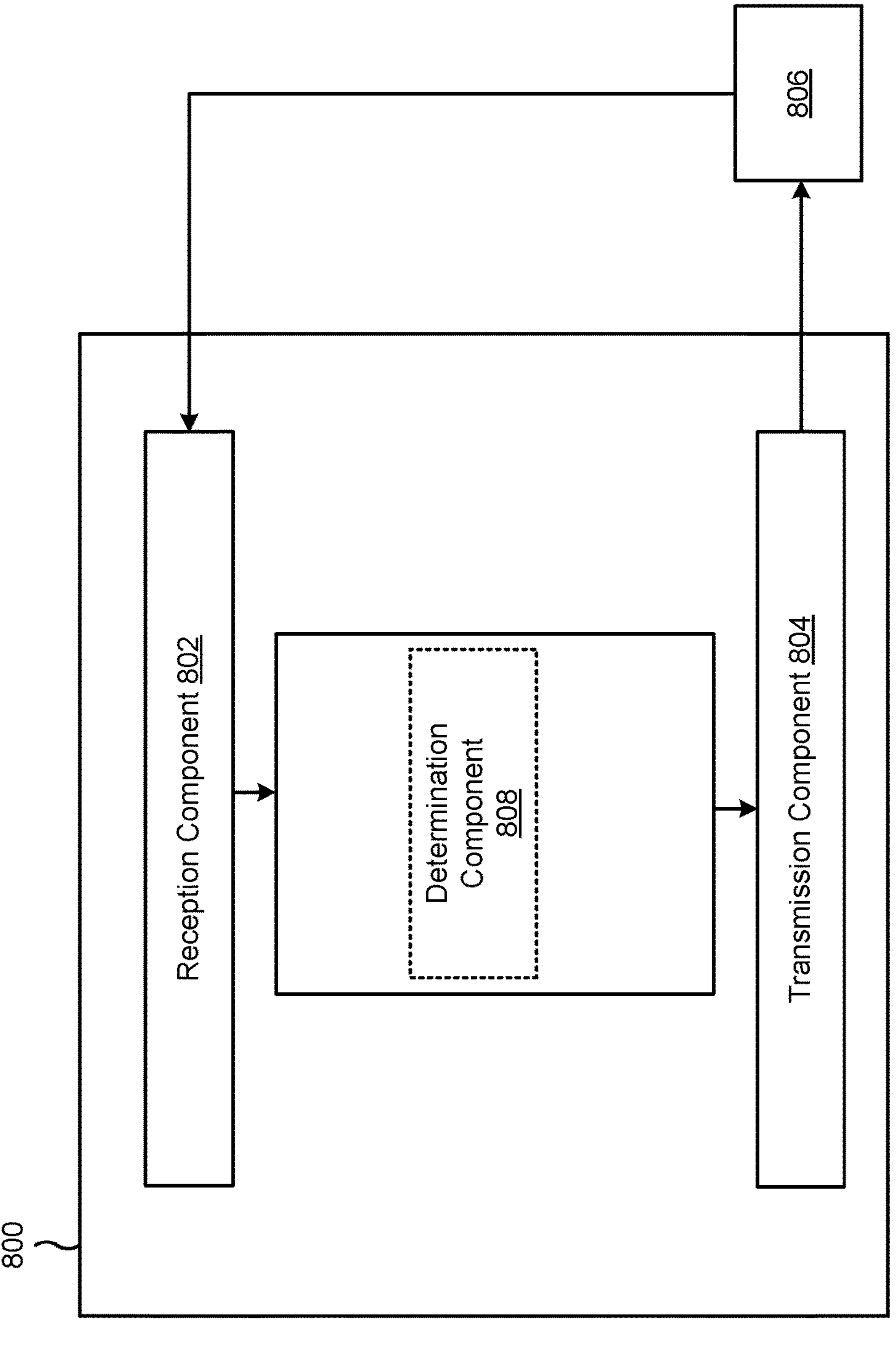

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a determination component 808, among other examples.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be collocated with the reception component 802 in a transceiver.

The transmission component 804 may transmit, to a UE, a grant including information for triggering a clear channel assessment based SRS transmission. The determination component 808 may determine the information for triggering the clear channel assessment based SRS transmission. In some aspects, the determination component 808 may include a controller/processor, a memory, or a combination thereof, of the base station described above in connection with FIG. 2. The reception component 802 may receive, from the UE, the SRS that initiates a shared COT on a channel based at least in part on the grant. The transmission component 804 may transmit downlink data to the UE on the channel in the shared COT.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

receiving, from a base station, a grant including information for triggering a clear channel assessment based sounding reference signal (SRS) transmission, wherein the information includes downlink grant downlink control information (DCI) with a frequency domain resource allocation (FDRA) field indicating an invalid FDRA assignment;

performing the clear channel assessment for a channel based at least in part on receiving the grant;

transmitting, to the base station, the SRS that initiates an uplink to downlink shared channel occupancy time (COT) on the channel based at least in part on performing the clear channel assessment; and receiving, from the base station, downlink data transmitted on the channel in the shared COT.

2. The method of claim 1, wherein the clear channel assessment is an extended clear channel assessment.

3. The method of claim 1, wherein the clear channel assessment is a listen-before-talk (LBT) procedure.

4. The method of claim 3, wherein the LBT procedure is a Category 4 LBT procedure.

5. The method of claim 1, wherein the DCI including an indication for triggering transmission of the SRS and an indication of a type of the clear channel assessment.

6. The method of claim 1, wherein the DCI includes an indication for triggering transmission of the SRS and does not include a valid physical downlink shared data channel (PDSCH) assignment.

7. The method of claim 6, wherein transmitting the SRS that initiates the shared COT on the channel comprises:

transmitting the SRS without transmitting a physical uplink control channel (PUCCH) communication based at least in part on the downlink grant DCI that includes the indication for triggering transmission of the SRS and does not include a valid PDSCH assignment.

8. The method of claim 1, further comprising:

receiving, from the base station, another information for triggering another clear channel assessment based SRS transmission, wherein the other information includes an uplink grant DCI that includes an indication for triggering transmission of the SRS and does not include a valid physical uplink shared data channel (PUSCH) assignment.

9. The method of claim 1, wherein the channel is in an unlicensed spectrum.

10. The method of claim 1, wherein the grant includes an indication of a time offset between the UE receiving the grant and the UE transmitting the SRS.

11. A method of wireless communication performed by a base station, comprising:

transmitting, to a user equipment (UE), a grant including information for triggering a clear channel assessment based sounding reference signal (SRS) transmission, wherein the information includes downlink grant downlink control information (DCI) with a frequency domain resource allocation (FDRA) field indicating an invalid FDRA assignment;

receiving, from the UE, the SRS that initiates an uplink to downlink shared channel occupancy time (COT) on a channel based at least in part on the grant; and transmitting downlink data to the UE on the channel in the shared COT.

12. The method of claim 11, wherein the clear channel assessment is an extended clear channel assessment.

13. The method of claim 11, wherein the clear channel assessment is a listen-before-talk (LBT) procedure.

14. The method of claim 13, wherein the LBT procedure is a Category 4 LBT procedure.

15. The method of claim 11, wherein the DCI includes an indication for triggering transmission of the SRS and an indication of a type of the clear channel assessment.

16. The method of claim 11, wherein the DCI includes an indication for triggering transmission of the SRS and does not include a valid physical downlink shared data channel (PDSCH) assignment.

17. The method of claim 11, further comprising:

transmitting, to the UE, another information for triggering another clear channel assessment based SRS transmission, wherein the other information includes an uplink grant DCI that includes an indication for triggering transmission of the SRS and does not include a valid physical uplink shared data channel (PUSCH) assignment.

18. The method of claim 11, wherein the channel is in an unlicensed spectrum.

19. The method of claim 18, wherein the grant includes an indication of a time offset between the UE receiving the grant and the UE transmitting the SRS.

20. A user equipment (UE) for wireless communication, comprising:

a memory; and one or more processors operatively coupled to the memory, the memory and the one or more processors configured to:

receive, from a base station, a grant including information for triggering a clear channel assessment based sounding reference signal (SRS) transmission, wherein the information includes downlink grant downlink control information (DCI) with a frequency domain resource allocation (FDRA) field indicating an invalid FDRA assignment;

perform the clear channel assessment for a channel based at least in part on receiving the grant;

transmit, to the base station, the SRS that initiates shared channel occupancy time (COT) on the channel based at least in part on performing the clear channel assessment; and receive, from the base station, downlink data transmitted on the channel in the shared COT.

21. The UE of claim 20, wherein the DCI including an indication for triggering transmission of the SRS and an indication of a type of the clear channel assessment.

22. The UE of claim 20, wherein the DCI includes an indication for triggering transmission of the SRS and does not include a valid physical downlink shared data channel (PDSCH) assignment.

23. The UE of claim 22, wherein the one or more processors are further configured to:

transmit the SRS without transmitting a physical uplink control channel (PUCCH) communication based at least in part on the downlink grant DCI that includes the indication for triggering transmission of the SRS and does not include a valid PDSCH assignment.

24. The UE of claim 20, wherein the one or more processors are further configured to:

receive, from the base station, another information for triggering another clear channel assessment based SRS transmission, wherein the other information includes an uplink grant DCI that includes an indication for triggering transmission of the SRS and does not include a valid physical uplink shared data channel (PUSCH) assignment.

25. The UE of claim 20, wherein the clear channel assessment is a listen-before-talk (LBT) procedure.

26. The UE of claim 20, wherein the grant includes an indication of a time offset between the UE receiving the grant and the UE transmitting the SRS.

27. A base station for wireless communication, comprising:

a memory; and one or more processors operatively coupled to the memory, the memory and the one or more processors configured to:

transmit, to a user equipment (UE), a grant including information for triggering a clear channel assessment based sounding reference signal (SRS) transmission, wherein the information includes downlink grant downlink control information (DCI) with a frequency domain resource allocation (FDRA) field indicating an invalid FDRA assignment;

receive, from the UE, the SRS that initiates an uplink to downlink shared channel occupancy time (COT) on a channel based at least in part on the grant; and transmit downlink data to the UE on the channel in the shared COT.

28. The base station of claim 27, wherein the DCI includes an indication for triggering transmission of the SRS and an indication of a type of the clear channel assessment.

29. The base station of claim 27, wherein the DCI includes an indication for triggering transmission of the SRS and does not include a valid physical downlink shared data channel (PDSCH) assignment.

30. The base station of claim 27, wherein the one or more processors are further configured to:

transmit, to the UE, another information for triggering another clear channel assessment based SRS transmission, wherein the other information includes an uplink grant DCI that includes an indication for triggering transmission of the SRS and does not include a valid physical uplink shared data channel (PUSCH) assignment.

* * * * *